(12) United States Patent
Farmer, III et al.

(10) Patent No.: US 6,480,646 B2
(45) Date of Patent: Nov. 12, 2002

(54) MICRO-MIRROR AND ACTUATOR WITH EXTENDED TRAVEL RANGE

(75) Inventors: Kenneth R. Farmer, III, Dunellen, NJ (US); Richard A. Brown, Fitzroy (AU); Xing-tao Wu, Woburn, MA (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 09/853,794

(22) Filed: May 11, 2001

(65) Prior Publication Data

US 2002/0012490 A1 Jan. 31, 2002

Related U.S. Application Data

(60) Provisional application No. 60/204,068, filed on May 12, 2000.

(51) Int. Cl.[7] ............................................. G02B 6/42
(52) U.S. Cl. .......................... 385/18; 385/9; 385/30; 385/130
(58) Field of Search ....................... 385/18, 14, 10, 385/12, 30, 9, 129, 130, 131; 359/872, 290, 291

(56) References Cited

U.S. PATENT DOCUMENTS

| | | | | |
|---|---|---|---|---|
| 5,589,974 A | | 12/1996 | Goossen et al. | 359/290 |
| 5,815,616 A | | 9/1998 | Bishop et al. | 385/88 |
| 5,835,256 A | * | 11/1998 | Huibers | 359/291 |
| 5,843,832 A | | 12/1998 | Farmer et al. | 438/406 |
| 5,923,798 A | | 7/1999 | Aksyuk | 385/19 |
| 5,940,558 A | | 8/1999 | Bishop et al. | 385/52 |
| 6,356,378 B1 | * | 3/2002 | Huibers | 359/291 |

* cited by examiner

*Primary Examiner*—Phan T. H. Palmer
(74) *Attorney, Agent, or Firm*—Richard C. Woodbridge; Woodbridge & Associates, P.C.

(57) ABSTRACT

The travel range is extended for electrostatically actuated micro mirrors used as attenuators, modulators and switches in optical networks by the use of dielectrically coated, preferably with Silicon dioxide, inner surfaces. Oxide charge and oxide capacitance combine to expand the travel range of the mirrors before snap down, at the expense of increased applied bias voltage. This method of travel range extension is preferred over other range extension methods due to its simplicity, reproducibility, and ease of manufacture, as well as benefits of decreased stiction and inhibited electrode shorting. A method for the manufacture of the devices is also disclosed.

33 Claims, 3 Drawing Sheets

MICRO-MIRROR AND ACTUATOR WITH EXTENDED TRAVEL RANGE

CROSS REFERENCE TO RELATED APPLICATIONS

This application claims the priority of provisional U.S. application Ser. No. 60/204,068 filed on May 12, 2000 and entitled "Micro-mirror/actuator with Extended Travel Range and Method Therefor" by Kenneth A. Farmer, Richard A Brown and Xing-tao Wu, the entire contents and substance of which are hereby incorporated in total by reference.

BACKGROUND OF THE INVENTION

1. Field of the Invention

This invention relates to a device for optical switching with extended travel range.

2. Description of Related Art

The shift of the Internet from the government and university realm into the public, commercial sphere has created unprecedented levels of growth in the demand for network services. Much of the existing network infrastructure is unable to meet these demands. Typically, these systems multiplex 45 Megabit per second (Mb/s) electrical signals to higher bit rates and transmit them on a single optical fiber. The recent development of dense wavelength division multiplexing (DWDM) systems has allowed these systems to expand by transmitting more than sixteen wavelength channels of data on a single fiber, at 2.5 gigabit per second Gb/s per channel. Currently, the latest commercially available DWDM systems allow up to 160 channels at 10 Gb/s per channel but systems under development using standard single mode optical fibers have demonstrated 3.2 Terabit per second Tb/s with 80 channels at 40 Gb/s per channel. However, this extraordinary expansion of network capacity must be matched by a commensurate expansion of network management infrastructure.

Existing optical networks require frequent conversion of the optical signals to the electrical domain and back again at repeaters and add/drop multiplexers with associated high cost and loss of flexibility. This has led to the vision of an all-optical 'photonic' network architecture, where signal amplification and switching functions are all performed at the optical layer. When considered together with the exponential growth of network bandwidth, the need to develop high performance, low cost active optical elements is desirable. Such elements include tunable lasers and filters, optical attenuators and switches. Currently all of these elements are built with silicon micro-machining (MEMS) techniques. MEMS based free space optical elements have the advantage of lower signal degradation than waveguide technology, reducing the requirements for optical amplification, and therefore lowering the system cost.

The micro-machined versions of the optical elements listed above all have at their core the common element of a movable reflective membrane. In order to achieve low insertion loss, that is, low signal attenuation, with typical beam divergences, and system geometries, the reflective surfaces must be rather large, on the order of 700×700 Mm2. However, large flat mirrors cannot be easily fabricated using conventional silicon deposition and micro-machining technology because the mirror surface, which is composed of gold (Au) on polycrystalline silicon (Si) for wavelength independent reflectivity near 1.5 Mm, constitutes a bimorph structure which is generally highly non-planar. In particular, the mirror will deform with variations in temperature, resulting in poor performance. While it is possible to work around these problems by careful design and stress engineering, a simpler solution is to make the device insensitive to stress by using an extremely thick silicon layer. This also allows the development of highly reflective or wavelength selective devices based on dielectric stacks, where the stresses would be more difficult to compensate.

Micromachined, electrostatically actuated mirrors can be used as variable attenuators, modulators and switches in optical networking systems. Fundamental issues such as the trade-off between extended travel range and low pull-in voltage need to be addressed in order to provide increased design freedom, for customized applications. In theory, the maximum travel range before snap down for full-plate electrostatic actuators is 44% of the full-scale deflection. The prior art has employed leveraged bending and strain stiffening in an effort to extend this range. Representative examples of the prior are contained in U.S. Pat. No. 5,589,974 issued to Goossen and U.S. Pat. No. 5,923,798 issued to Aksyuk The disclosed device relies on a combination of series dielectric layers and intrinsically trapped electrostatic charges to provide a completely electronic means for extension of the range of travel for the micro mirror.

BRIEF SUMMARY OF THE INVENTION

The invention relates to a micro-machined, electrostatically-acutated optical attenuator/switch fabricated by fusion bonding of single crystal, ultra-thin silicon wafers. The travel range of the reflective element is extended by a dielectric layer on the under side of the reflective element and a corresponding dielectric layer on the substrate below and facing the reflective element. The dielectric element is fabricated so as to have a permanent electrical charge. The two facing dielectric layers have identical electrical charge so that when the reflective element flexes toward the substrate, electrostatic forces act to repel the reflective element. In addition, oxide charge of each electrode acts in parallel with the electrostatic attraction, in the case of similarly charged electrodes decreasing the effective actuation voltage and increasing the travel range before snap-down. The oxide capacitance acts as a voltage divider, lowering the effective actuation voltage across the gap of the mirror structure. The insulating properties of the dielectric layers, absent a charge, also provide some degree of travel extension and inhibit electrode shorting. The net result is to extend the angle over which the reflective element may travel before it snaps down and sticks to the substrate layer, known as stiction. The device contains a large area, electrostatically actuated micro-mirror for use as a variable attenuator or switch in optical networking systems. An embodiment shows the device with a reflective surface ranging from 400 to 700 micrometers square and from 2 to 200 microns thick with two torsional springs mounted on adjacent corners. The torsional springs may contain from 1 to 3 elements depending on the application and the desired spring constant. In alternate embodiments the reflective surface may be in the shape of a circle. The reflective element is a front surface mirror coated with a thin reflective coating to bounce the incoming light beam back to a receiver. A bias voltage is applied across the reflective coating on the reflector and the silicon substrate. The reflective surface deflects toward the substrate when the bias voltage is applied. The angle at which the reflective surface deflects the incoming beam is determined by the bias voltage value. As deflection increases and the micro-mirror gets closer to the substrate, the eletrostatic repulsion increases.

Thus as deflection increases, a given incremental deflection requires a larger bias voltage to achieve the same deflection. A deflection angle of up to 1 degree has been achieved with the device. Eventually, the electronic attraction due to the bias voltage overcomes the electrostatic repulsion of the intrinsic charge and the mirror sticks to the substrate. This phenomenon is referred to as stiction.

The thickness of the reflective element is such that it remains flat over the desired range of deflection angles.

The devices are fabricated by fusion bonding ultra-thin, defined as less than 200 microns, single crystal silicon wafers to a micro-machined silicon substrate. This forms robust, non-deforming, reflective surfaces which are simpler to fabricate than similar devices fabricated by conventional chemical vapor deposition of polycrystalline silicon, which require careful engineering to avoid stress-induced deformation. Deep Reactive Ion Etching DRIE is used to form the torsional spring structures and the outline of the reflective surface. Dry etching employing Reactive Ion Etching (RIE) is then used to etch through the silicon oxide layer on the underside of the reflective element to free the reflective structure from the surrounding material, while leaving the oxide layer intact on the underside of the reflective element and the substrate. Finally, a Chromium layer is deposited on the silicon reflective element and a layer of gold is used as the reflecting surface.

DETAILED DESCRIPTION OF THE INVENTION

During the course of this description like numbers will be used to identify like elements according to the different figures which illustrate the invention.

Micro-machined, electrostatically actuated mirrors can be used as variable attenuators, modulators and switches in optical networking systems. Fundamental issues such as the trade-off between extended travel range and low pull-in voltage need to be addressed in order to provide increased design freedom, for customized applications. In theory, the maximum travel range before snap down for full-plate electrostatic actuators is 44% of the full-scale deflection. Leveraged bending and strain stiffening have been examined to extend this range.

Figure 1:
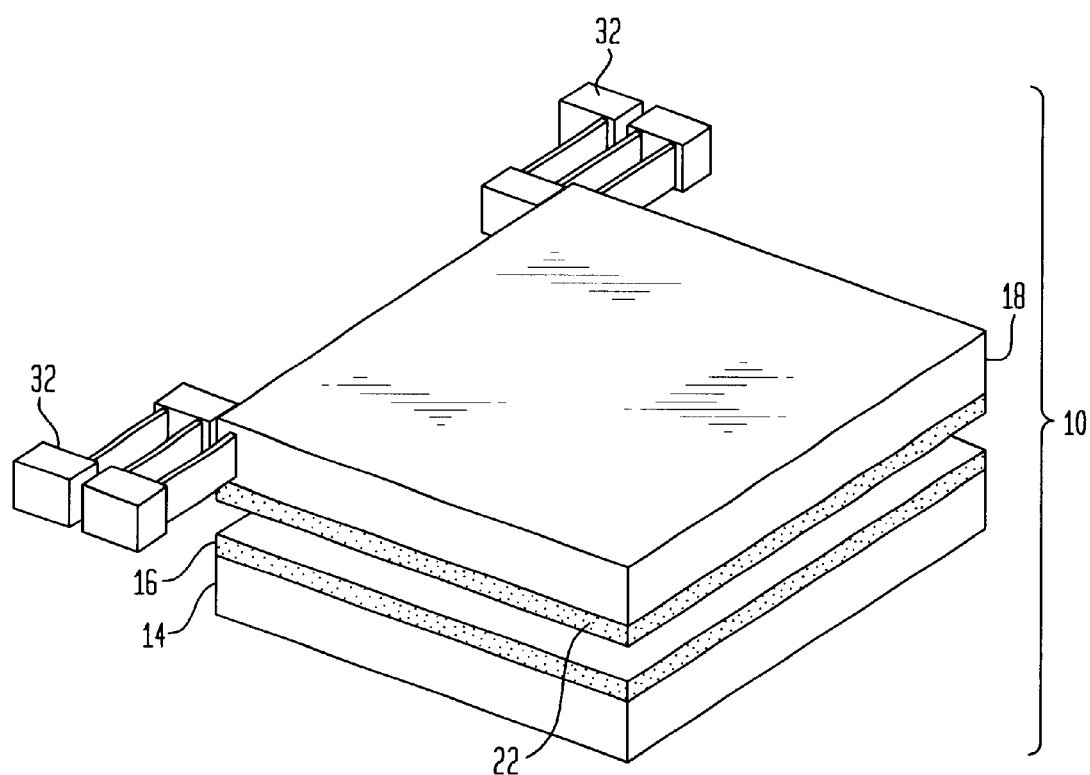
FIG. 1 shows a preferred embodiment of the present invention.

FIG. 1 shows a preferred embodiment of the present invention. Silicon micro-mirror 10 comprises a cantilever electrode 18 coated on the top with a reflecting layer of chromium/gold and on the bottom by a layer of dielectric silicon dioxide 22 and supported by two three-beam torsion springs 32 on adjacent comers, and a full plate bottom electrode 14, the inner surface of which is also coated with a layer of silicon dioxide.

The capacitance of the silicon dioxide 22 layer on the inner surface of the mirror acts as a voltage divider, lowering the effective actuation voltage across the gap of the mirror structure. In addition, the similar charge on the oxide layers on each electrode acts in parallel with the electrostatic attraction provided by the bias voltage, decreasing the effective actuation voltage and increasing the travel range before snap down. In addition, the oxide charge functions to inhibit both stiction and electrode shorting as snap-down. The silicon dioxide layer in conjunction with the air gap between the mirror and the substrate can be considered a series capacitor in that the dielectric layers are in series. An additional layer of a third dielectric may be interposed in series with the air and silicon to accommodate a specific application. This third dielectric layer may be composed of a material such as silicon nitride or halfnium oxide.

Two major types of oxide charges exist in thermally oxidized silicon, namely, trapped and fixed charge. The typical range of net oxide charge, $10^{10}$–$10^{12}$ cm$^{-2}$, is roughly the same order of magnitude as the electrode surface charge due to bias voltages in the range 1 to 200 V. Significant repulsive interaction occurs if the oxides are a small distance apart and obtained from the same processing conditions. Thus an extra repulsive torque is added to the attractive electrostatic torque, introducing a negative feedback mechanism into the mirror structure, with the same non-linear electrode separation dependence as the attractive torque. The electrostatic attractive torque becomes less sensitive to increases in bias voltage, and this reduced net torque enables the elastic spring structure of the device to balance the net electrostatic torque at an expanded deflection angle before snap down, observed to be up to 62% of full scale in these devices. The net charge in these oxides is easily controllable by temperature an oxidation ambient conditions.

Figure 2A:
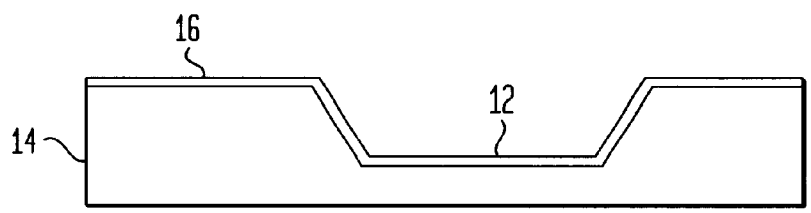
FIGS. 2a–d show the steps of the method for fabrication of the preferred embodiment of FIG. 1.
Figure 2B:
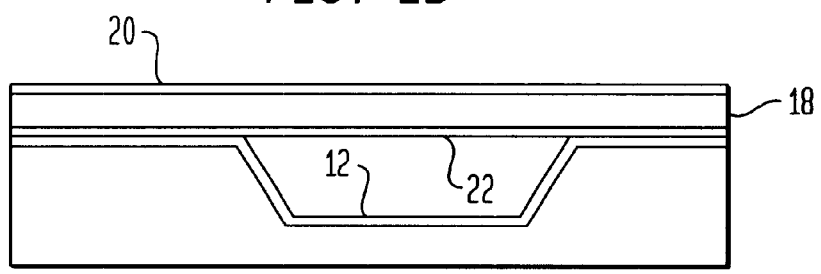

FIGS. 2a–d depict the sequence for fabrication of a preferred embodiment of the invention. Bulk anisotropic etching with potassium hydroxide is used to produce a plurality of cavities 12 in 4-inch standard low resistivity silicon substrate wafers 14 of standard thickness of approximately 500μ by techniques known in the art. The substrate wafers 14 are then oxidized by a standard thermal process such as treatment with oxygen and water vapor at 1050-1100° C. for one hour to form an insulating layer of silicon dioxide 16 of approximately 1μ. FIG. 2a illustrates one such cavity. Ultra-thin low resistivity silicon wafers 18 having a thickness of 200μ or less, preferably about 50μ, are oxidixed using standard techniques to form a top and bottom silicon dioxide layer, 20 and 22 respectively, and then fusion bonded to the substrate wafers 14 in a vacuum chamber, forming sealed cavities 12, as depicted in FIG. 2b. A method for fusion bonding has been described in U.S. Pat. No. 5,843,832 issued to Kenneth Farmer. The method employed in fabricating the present device is a modification of the Farmer method in that the bonding is performed in a vacuum. The bonding process can be accomplished by standard techniques such as with an EV 501 universal bonding tool available from EVI. The edges of the silicon substrate wafers and the ultra-thin wafers are initially kept apart by means of spacers, so that initial contact between the wafers is made at their centers. Removal of the spacers allows contact to proceed from the centers to the edges. After applying a moderate amount of pressure to ensure complete contact, bonding is completed by heating the combined wafers at 1050–1100° C. for 1–2 hr.

Figure 2C:
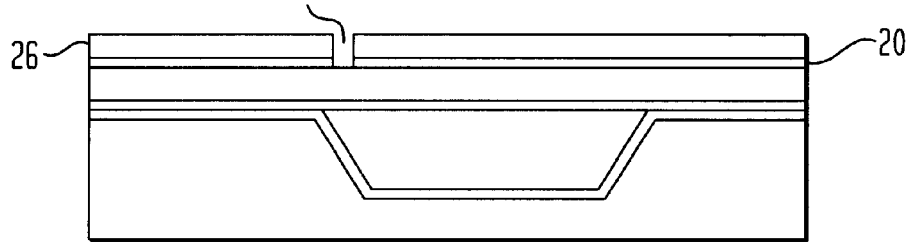

A mirror surface shape and springs are then patterned 24 in the top layer using photoresist 26 as depicted in FIG. 2c. Treatment of the top silicon dioxide layer 20 of the ultra-thin wafer with wet hydrogen fluoride etches through the silicon dioxide layer to remove the layer. Etching of the silicon layer 18 of the ultra-thin wafer is then accomplished by inductively coupled plasma deep reactive ion etching.

Figure 2D:
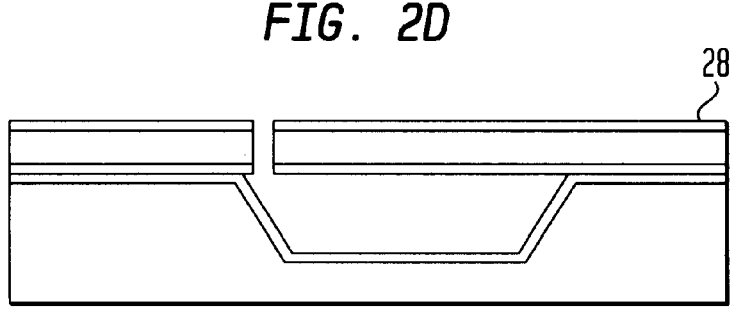

Removal of the silicon dioxide directly below the silicon removed by the deep reactive ion etching, is accomplished by reactive ion etching with fluorine gas. Vapor deposition on the mirrors of a layer of chromium metal approximately 50 Å thick, followed by vapor deposition of a layer of gold approximately 200 Å thick as shown in FIG. 2d creates reflective mirror surfaces 28. The wafers can then be diced and mounted for use.

Figure 3A:
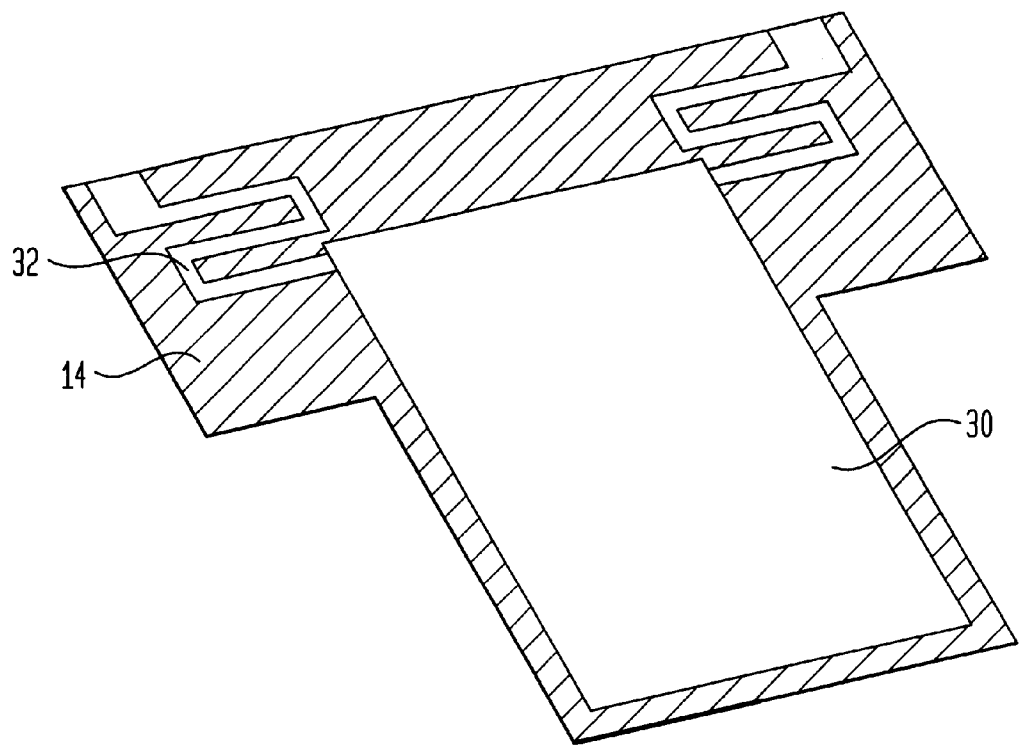
FIG. 3a illustrates a top view of the mirror surface showing the torsional springs.

FIG. 3a shows a scanning electron microscope (SEM) image of a typical device showing the extremely large (700×700$\mu^2$) mirror surface 30 and supporting springs 32. The entire mirror is suspended in space over the etched cavity 14, only supported at the two places where the serpentine springs join the surrounding region.

Figure 3B:
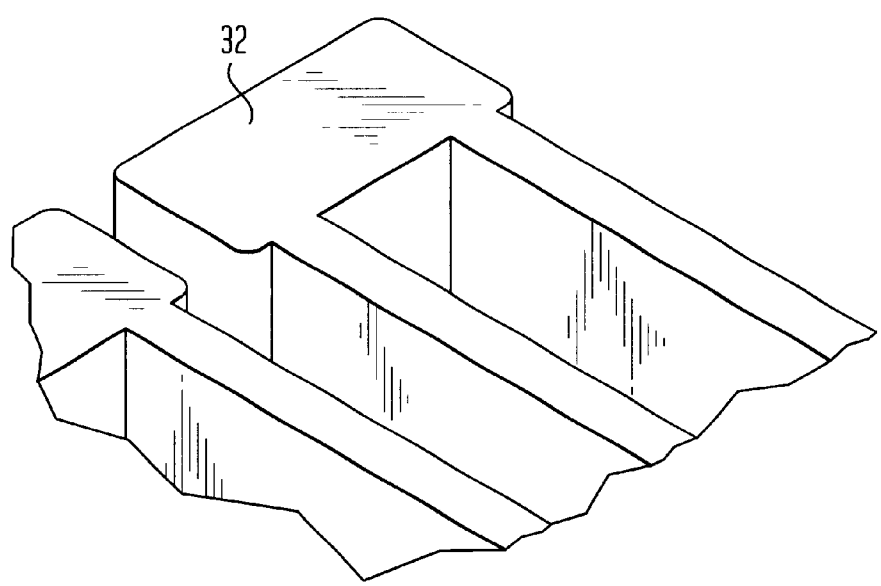
FIG. 3b illustrates a close up view of the 3 beam torsional springs.

FIG. 3b shows a close-up of the springs 32 themselves. These springs comprise three elements parallel to the desired rotational axis which are designed to twist without lowering into the cavity, so that the electrostatic energy produces a deflection of the mirror rather than merely pulling it down at both ends into the cavity.

Multiple devices produced according to the above method can be fabricated a single sheet of silicon for the substrate and a single sheet of silicon for the ultra thin layer thus affording the economy of mass production. The capacitance and intrinsic electrostatic charge provided by the dielectric layers on the underside of the mirror and the facing side of the substrate combine to produce an increase in travel range for the mirror element at the expense of an increase in bias voltage required at larger deflection angles. The larger deflection angle affords the advantage of using more receivers than is possible with devices that have lower deflection angles.

While the invention has been disclosed with reference to the preferred embodiment thereof, it will be appreciated by those of ordinary skill in the art that various changes can be made to the structure and steps necessary to fabricate the device without departing from the spirit and scope of the invention as a whole.

We claim:

1. A micro-mechanism apparatus for transmitting at least a portion of a beam of light from one light source to a receiving source in response to an electrical signal, said micro-mechanism comprising:

an ultra-thin member having a given configuration;

a substrate defining a cavity having a configuration slightly larger than said ultra-thin member to receive said ultra-thin member;

resilient means secured to said ultra-thin member and to said substrate to bias said ultra-thin member to a given position relative to said substrate for movement of said ultra-thin member away from said given position toward and away from said cavity in said substrate;

electrical insulation disposed between said ultra-thin member and said substrate within said cavity;

a reflective surface on said ultra-thin member distal from said cavity; and actuation means to move said ultra-thin member toward said cavity.

2. A micro-mechanism apparatus according to claim 1 wherein said resilient means holds said ultra-thin member at one side to cantilever said ultra-thin member away from said substrate over said cavity.

3. A micro-mechanism apparatus according to claim 2 wherein said actuation means comprises electrical means interconnecting said ultra-thin member and said substrate to create an electrostatic charge between said ultra-thin member and said substrate to draw said ultra-thin member toward said substrate against the torque of said resilient means.

4. A micro-mechanism apparatus according to claim 3 further comprising oxide capacitance means on said ultra-thin member and said substrate to define a voltage divider to lower the effective actuation voltage between said ultra-thin member and said substrate.

5. A micro-mechanism apparatus according to claim 4 wherein said ultra-thin member is 200 $\mu$m or less and made of silicon.

6. A micro-mechanism apparatus according to claim 5 wherein said substrate is made of silicon and has a thickness of approximately 500 $\mu$m.

7. A micro-mechanism apparatus according to claim 6 wherein said insulation is a material chosen from the group consisting of silicon nitride, silicon dioxide and halfnium oxide.

8. A micro-mechanism apparatus according to claim 7 wherein said insulation is silicon dioxide of a thickness of about 1 $\mu$m.

9. A micro-mechanism apparatus according to claim 8 wherein said ultra-thin member is of a thickness of 50 $\mu$m plus or minus 10 $\mu$m.

10. A micro-mechanism apparatus according to claim 4 wherein said insulation is a material chosen from the group consisting of silicon dioxide, silicon nitride and halfnium oxide.

11. The micro-mechanism apparatus according to claim 10 wherein said insulation is silicon dioxide.

12. A micro-mechanism apparatus according to claim 11 wherein a halfnium oxide layer is located over said silicon dioxide insulation.

13. A micro-mechanism apparatus according to claim 4 further comprising electrical insulation disposed between said ultra-thin member and said substrate.

14. A micro-mechanism apparatus according to claim 4 wherein said insulation is thermally oxidized silicon having oxide charges trapped and fixed of $10^{10}$ to $10^{12}$ cm$^{-2}$.

15. A micro-mechanism apparatus according to claim 2 wherein said ultra-thin member is 200 $\mu$m or less and made of silicon.

16. A micro-mechanism apparatus according to claim 15, wherein said substrate is made of silicon and has a thickness of approximately 500 $\mu$m.

17. A micro-mechanism apparatus according to claim 16 wherein said cavity is approximately 450 $\mu$m deep.

18. A micro-mechanism apparatus according to claim 1 wherein said insulation is a material chosen from the group consisting of silicon nitride, silicon dioxide and halfnium oxide.

19. A micro-mechanism apparatus according to claim 18 wherein said insulation substantially covers said cavity and the portion of said ultra-thin member facing said cavity.

20. A micro-mechanism apparatus according to claim 19 wherein said ultra-thin member is of a thickness of from 2 $\mu$m to 100 $\mu$m.

21. A micro-mechanism apparatus according to claim 20 wherein said ultra-thin member is of a thickness of 50 $\mu$m plus or minus 10 $\mu$m.

22. A micro-mechanism apparatus according to claim 19 wherein said insulation is thermally oxidized silicon having oxide charges trapped and fixed of $10^{10}$ to $10^{12}$ cm$^{-2}$.

23. A micro-mechanism apparatus according to claim 18 wherein said insulation is silicon dioxide of a thickness of about 1 $\mu$m.

24. A micro-mechanism apparatus according to claim 1 wherein said reflective surface covers the entire configuration of said ultra-thin member.

25. A micro-mechanism apparatus according to claim 24 wherein said reflective surface is square with sides having a length of from 400 µm to 700 µm.

26. A micro-mechanism apparatus according to claim 24 wherein said reflective surface is circular.

27. A micro-mechanism apparatus according to claim 1 wherein said ultra-thin member is relatively flat having a curvature of one (1) meter or greater in any given plane of said configuration.

28. A micro-mechanism apparatus according to claim 1 wherein said resilient means are beam torsion springs chosen from the group consisting of single, double and triple beam torsion springs.

29. A micro-mechanism apparatus according to claim 28 wherein said beam torsion springs have a width of from 5 µm to 10 µm.

30. A micro-mechanism apparatus according to claim 29 wherein said beam torsion springs have an aspect ratio of 5:1 to 10:1 wherein the thickness of each of said beams is five (5) to ten (10) times greater than the width of the beam measured in the same area of the beam.

31. A micro-mechanism apparatus according to claim 28 wherein said ultra-thin member and said beam torsion springs have a resonant frequency of three (3) kHz or less.

32. A micro-mechanism apparatus according to claim 1 wherein said ultra-thin member moves into said cavity a distance of six (6) µm.

33. A micro-mechanism apparatus according to claim 1 wherein said ultra-thin member is relatively flat having a curvature equal to or greater than one (1) meter in any given plane through said ultra-thin member and said ultra-thin member deflects at an angle of 0.5 degrees relative to said given position upon movement of said ultra-thin member into said cavity.

* * * * *